(No Model.) 3 Sheets—Sheet 1.

J. TRAVIS.
COMBINED MAP CASE AND HOLDER.

No. 294,162. Patented Feb. 26, 1884.

Witnesses.

Inventor
Jerome Travis,
By Jno. G. Elliott
Atty.

(No Model.) 3 Sheets—Sheet 2.
J. TRAVIS.
COMBINED MAP CASE AND HOLDER.

No. 294,162. Patented Feb. 26, 1884.

Witnesses
Willie Rossiter
Chas. G. Page

Inventor:
Jerome Travis
By Jno. G. Elliott
Atty.

(No Model.) 3 Sheets—Sheet 3.
J. TRAVIS.
COMBINED MAP CASE AND HOLDER.
No. 294,162. Patented Feb. 26, 1884.
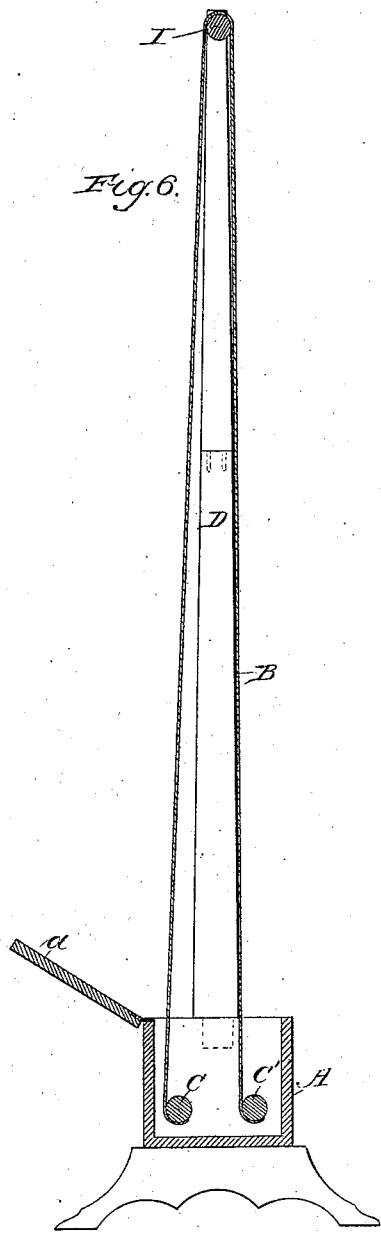

UNITED STATES PATENT OFFICE.

JEROME TRAVIS, OF NORTH ADAMS, MICHIGAN.

COMBINED MAP CASE AND HOLDER.

SPECIFICATION forming part of Letters Patent No. 294,162, dated February 26, 1884.

Application filed October 8, 1883. (No model.)

*To all whom it may concern:*

Be it known that I, JEROME TRAVIS, a citizen of the United States, residing in North Adams, county of Hillsdale, and State of Michigan, have invented certain new and useful Improvements in Combined Map Case and Holder, of which the following is a specification.

The object of my invention is to provide simple and efficient means whereby a map or maps can be displayed to advantage, and afterward the map and its supporting media packed within a small compass, and the entire structure rendered portable and capable of being carried by hand from place to place as readily and easily as an ordinary valise. A further object is to simplify and cheapen the construction of a map-holder, and to combine with facilities for displaying a large area of maps a lightness of structure which will admit of the apparatus being shifted in various positions in a room, so as to obtain the best light on the map. A further object is to provide certain improved details of construction, all as hereinafter described and claimed, and illustrated in the annexed drawings, in which—

Figure 1:
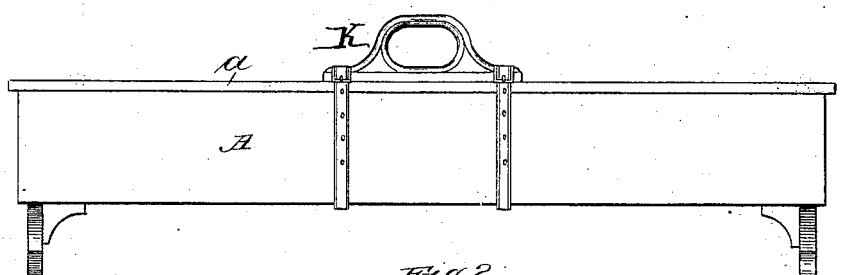
Figure 2:
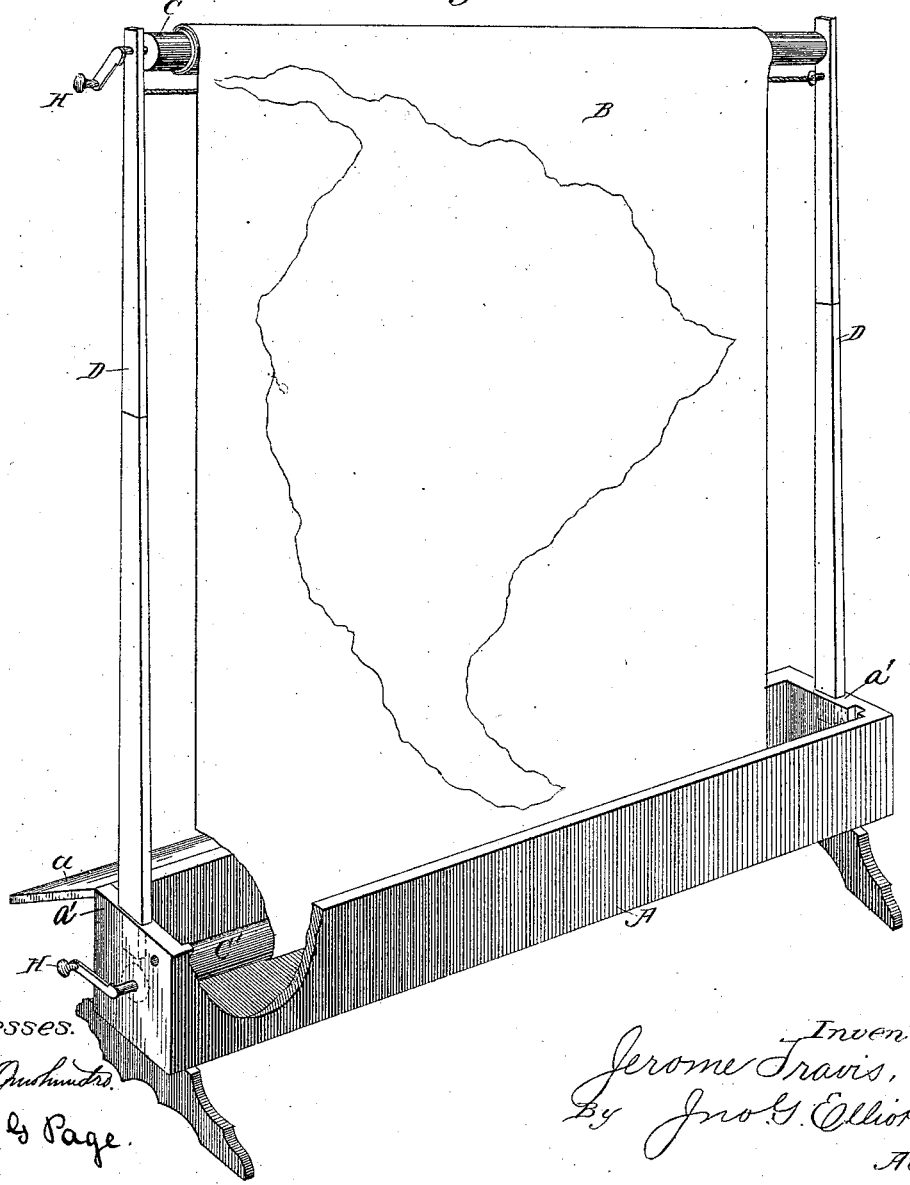
Figure 3:
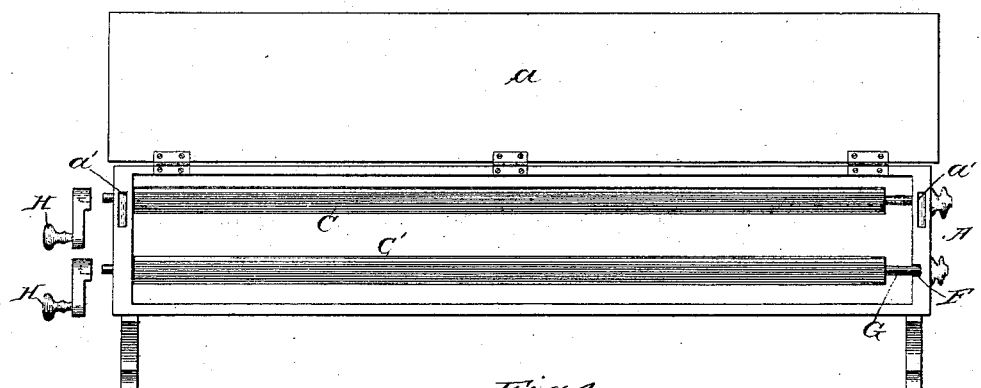
Figure 4:
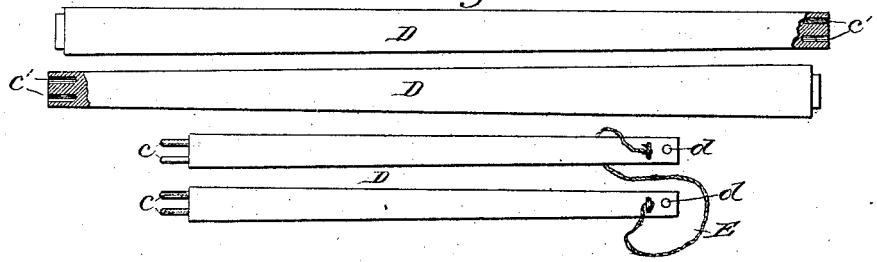
Figure 5:
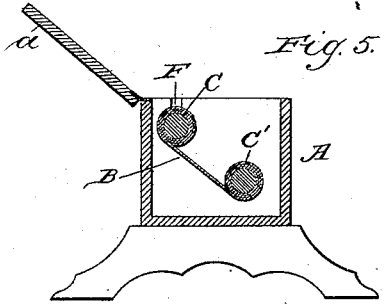

Figure 1 is a side elevation of the map case or holder, having the lid closed and an ordinary hand-strap secured around the case, so as to admit of the same being readily carried by hand, it being understood that the map and devices for spreading out and supporting the same on the case are all packed within the latter. Fig. 2 is a perspective view of the case open and the map drawn up from the same and held spread out by the supporting devices, which have been taken out from the case and set up thereon. Fig. 3 is a top or plan view of the case with its lid open and the map removed, in order to show the map-rollers within the case, the crank-handles in this view being shown detached. Fig. 4 includes the sections of the two standards, and illustrates the means whereby they can be connected together. Fig. 5 is a transverse section through the map-case, with the map wound on the rollers. Fig. 6 is a transverse vertical section of the map drawn up from the case, and shows a slightly-different way of accomplishing the same result as in Fig. 2. Fig. 7 illustrates a third roller, employed when the map is to be raised as in Fig. 6.

The map case or holder A, which is made of suitable dimensions, is preferably provided at its ends with legs or supports, and has a hinged cover, *a*, which can be closed upon the case and fastened in any appropriate way. The map B, which can be of any required length, is attached at its ends to a pair of rollers, C and C', upon either or both of which it can be wound—for example, as in Fig. 5, in which the map is shown wound upon both of these rollers, whereby it is brought within a small compass. These rollers are of such length that they can be arranged parallel with each other and longitudinally within the case, and hence when they are both journaled within the latter and the map wound up the lid of the case can be closed. This case is provided at its ends with sockets $a'$, or with straps or other analogous or suitable means for receiving and holding a pair of standards, D, capable of being packed within the case, or of being taken out and set up thereon as a means for supporting the map after the latter has been drawn up from the case in the manner which will be presently explained. These standards are made in sections capable of being connected together, so that they can be set up to a height sufficient to admit of the display of a desirable area of the map, or be taken apart and placed within the case. As a simple and efficient mode of connecting these sections of standards together, I provide some of them with dowel-pins *c*, and others with sockets *c'*, for receiving said pins, as in Fig. 4, although it will be evident that other means, such as hinges, sleeves, or the like, could be employed for a similar purpose. The top sections of these sectional standards are provided with journal-bearings *d* for the journals of one of the rollers, by which the map will be upheld in a spread-out condition above the case, and in order to prevent the standards from spreading apart and to hold such roller at their upper ends, I propose connecting the top sections, or the lower sections, if preferred, by a chain or cord, E, (shown in Figs. 2 and 4,) which will in no wise prevent the standards being placed within the case after they have been taken apart.

In Fig. 2 I have shown the standards set up, and one of the map-rollers taken out from the case and mounted between the upper ends of the two standards, a crank-handle, H, being applied to a journal of each roller in order that the map can be wound from one roller to the other. To admit of such manipulation of the map and rollers, one of the latter will be removably mounted within the case, so that it can be taken out and mounted between the standards, and to such end I can either provide in the inner wall of the case a channel, F, running down from the top edge thereof to one of the bearings for one of the roller-journals, or I can pass a pin, G, through one end of the case and mount one end of the roller on said pin, so that by removing the pin the roller can be taken out. The remaining roller can be either permanently or temporarily journaled in the case, and has one of its journals extending through the same, so as to admit of one of the crank-handles H being fitted thereon, in order to allow the roller to be turned when the map is to be wound thereon. The removable roller will also, by preference, have at one end a journal extending through and out from one end of the case for a like purpose, it being understood that these crank-handles H are constructed to be temporarily fitted to the roller-journals, whereby, after use, they can be taken off and placed within the case. When the removable roller is taken out from the case, the map will unroll from one or both rollers, according to the way in which it has been previously wound, and the said removable roller can be readily mounted between the top ends of the standards by passing its permanent journal through one standard, and supporting the other end of the roller by the pin G, previously employed in supporting the roller within the case, after which one of the crank-handles can be fitted to the journal of the roller and then turned so as to unwind the map from the lower and spread it upon the upper roller. In some cases it might be preferred to permanently mount or leave the two map-rollers within the case, and raise the map by means of a roller capable of being laid loosely within the case, and of being mounted between the top ends of the standards so as to support the map in an unrolled condition, and in such event I can employ a roller, I, and by placing it under the map between the two rollers and lifting it up to the top ends of the standards the map will be partly unrolled from rollers C C′, and be spread out, as in Fig. 6, in which it will be seen that the map between the two rollers journaled in the case simply passes over the top roller. In such case the map can be drawn over the elevated roller by turning either one of the rollers within the case. After use, the upper roller can be taken down and placed within the case, and the map also wound up within the latter. A hand-strap, K, may be then passed around the case, so that it can be conveniently carried. In some cases it may be preferable to provide the oblong map-case with detachable legs, so that after use the legs can also be detached and placed within the case.

From the foregoing it will be seen that in both instances the map is attached to two rollers, and that it can be rolled upon one or both within the case, and that whether a third roller is employed to support the map at the top ends of the standards, or one of the two rollers to which the map is attached round and mounted between the standards, an elevated supporting-roller is provided and means afforded for admitting of the map being rolled from one roller to another, while a suitable portion of the map is exposed above the case.

Having thus described my invention, what I claim, and desire to secure by Letters Patent, is—

1. A portable map-holder consisting of a case provided with map-rollers, and with a pair of detachable standards adapted, when set upon the case, to support in an elevated position a roller for holding the map in a spread-out condition, substantially as described.

2. The combination, with the map-case provided with a pair of map-rollers, of the removable sectional standards adapted to support a roller above the case, one of said rollers being removably journaled within the case, whereby it can be removed and mounted between the standards, substantially as described.

3. The herein-described portable map-holder, comprising map-rollers and removable sectional standards, all capable of being contained within the case, said standards and one of the rollers being also capable of adjustment above the case, substantially in the manner and for the purpose specified.

4. The combination, with the case A, of the sectional standards removably supported thereon, the upper map-roller mounted between the upper ends of the standards, the lower map-roller mounted in the box, the map disposed substantially as described, and the crank-handles for operating the map-rollers, substantially as and for the purpose set forth.

5. The map-case A, containing a pair of map-rollers, and having sockets for receiving a pair of standards for supporting a roller for the maps thereon, said case being provided with a hinged lid, substantially as described.

JEROME TRAVIS.

Witnesses:
CHAS. G. PAGE,
JNO. G. ELLIOTT.